(12) United States Patent
Chong et al.

(10) Patent No.: US 9,280,176 B2
(45) Date of Patent: Mar. 8, 2016

(54) DISPLAY DEVICE

(71) Applicant: Samsung Display Co., Ltd., Yongin, Gyeonggi-Do (KR)

(72) Inventors: Jong Ho Chong, Hwaseong-si (KR); Seung Bae Lee, Seoul (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 92 days.

(21) Appl. No.: 14/289,225

(22) Filed: May 28, 2014

(65) Prior Publication Data

US 2015/0192951 A1   Jul. 9, 2015

(30) Foreign Application Priority Data

Jan. 7, 2014   (KR) .................. 10-2014-0001934

(51) Int. Cl.
*G02F 1/1335* (2006.01)
*G06F 1/16* (2006.01)
*G02B 1/10* (2015.01)

(52) U.S. Cl.
CPC ............... *G06F 1/1601* (2013.01); *G02B 1/10* (2013.01); *G02B 1/105* (2013.01); *G06F 1/16* (2013.01)

(58) Field of Classification Search
CPC ... G02F 1/1601; G02F 1/1637; G02F 1/1616; G02F 1/13338; G02F 3/0412; G02F 1/1334; G02B 1/105; G02B 27/0172; G02B 5/30; G02B 2027/0118; G02B 27/0101; G02B 27/01

USPC .................................................. 349/11, 12, 16
See application file for complete search history.

(56) References Cited

U.S. PATENT DOCUMENTS

| | | | |
|---|---|---|---|
| 6,304,308 B1 * | 10/2001 | Saito | G02F 1/133512 349/110 |
| 8,269,741 B2 | 9/2012 | Lee et al. | |
| 8,436,819 B2 | 5/2013 | Huang et al. | |
| 2006/0109414 A1 * | 5/2006 | Liao | G02F 1/133305 349/158 |
| 2013/0142975 A1 | 6/2013 | Wallace | |

FOREIGN PATENT DOCUMENTS

| | | |
|---|---|---|
| JP | 2012-207166 A | 10/2012 |
| KR | 10-2009-0103537 A | 10/2009 |
| KR | 10-2010-0124012 A | 11/2010 |
| KR | 10-1038329 B1 | 5/2011 |
| KR | 10-2012-0034506 A | 4/2012 |
| KR | 10-2012-0070253 A | 6/2012 |

* cited by examiner

*Primary Examiner* — Mike Qi
(74) *Attorney, Agent, or Firm* — Knobbe, Martens, Olson & Bear, LLP

(57) ABSTRACT

A display device is disclosed. In one aspect, the display device comprises a display panel, a window, a plurality of partitions, and an adhesive. The display panel is configured to display an image. The window is placed over the display panel. The plurality of partitions interposed between the display panel and the window. The adhesive is formed between adjacent partitions.

18 Claims, 12 Drawing Sheets

DISPLAY DEVICE

This application claims priority from Korean Patent Application No. 10-2014-0001934 filed on Jan. 7, 2014 in the Korean Intellectual Property Office, the disclosure of which is incorporated herein by reference in its entirety.

BACKGROUND

1. Field

The described technology generally relates to a display device.

2. Description of the Related Technology

Due to developments in information technology, the market for display devices has continued to expand, and the use of display devices such as organic light-emitting diode (OLED) displays, liquid crystal displays (LCDs), and plasma display panel (PDP) displays has increased. In recent years, the user demand for flexible displays has also grown, and research is continuing to be conducted for flexible displays. Flexible displays require not only display panels, but also transparent windows disposed over the display panels, to be flexible. For this, flexible displays use polymer-based windows, instead of glass windows that are commonly used in typical display devices.

SUMMARY OF CERTAIN INVENTIVE ASPECTS

One inventive aspect is a display device which has improved robustness against various external factors and still can maintain its flexible properties.

Another aspect is a display device comprising a display panel configured to display an image, a window placed over the display panel, a plurality of partitions interposed between the display panel and the window, and an adhesive formed between adjacent partitions.

In the above display device, each of the partitions has a substantially quadrilateral bar shape. In the above display device, the partitions contact the display panel and the window.

In the above display device, the partitions are substantially evenly spaced apart.

The above display device further comprises a plurality of protective layers formed on a top surface of the display panel and a bottom surface of the window.

In the above display device, the display panel includes a foldable area and a non-foldable area, wherein the partitions are spaced apart at larger intervals in the foldable area than in the non-foldable area.

In the above display device, the adhesive is formed of an optical transparent adhesive material, wherein at least one of the partitions is formed of a curable resin, perhydropolysilazane (PHPS), or silicon oxide (SiO2).

In the above display device, the partitions are spaced apart from one another and arranged in a first direction, wherein each partition extends in a second direction crossing the first direction. In the above display device, the display panel has a width, wherein each of the partitions has a length, and wherein the length and width are measured in a third direction substantially perpendicular to the first and second directions.

In the above display device, each of the partitions has a width measured in the first direction, wherein the width is less than the distance between neighboring partitions.

Another aspect is a display device comprising a display panel configured to display an image, a window placed over the display panel, a plurality of first partitions formed on a top surface of the display panel and spaced apart from one another, a plurality of second partitions formed on a bottom surface of the window facing the first partitions, respectively, and spaced apart from one another, and adhesive layer placed between the adjacent partitions, wherein the first partitions are spaced apart from the second partitions.

In the above display device, a first distance is defined as the distance between adjacent first partitions, wherein a second distance is defined as the distance between adjacent second partitions, and wherein the first and second distances are substantially the same.

In the above display device, at least one of the first partitions at least partially overlaps the corresponding second partition.

In the above display device, at least one of the first partitions does not overlap the corresponding second partition.

In the above display device, the display panel includes a foldable area and a non-foldable area, wherein the first and second buffer members have a smaller cross-sectional area in the foldable area than in the non-foldable area.

In the above display device, none of the first and second partitions overlap.

In the above display device, the first and second partitions are alternately formed.

Another aspect is a display device comprising a display panel configured to display an image, a window placed over the display panel, a plurality of first partitions formed on a top surface of the display panel and spaced apart from one another, three or more spacers interposed between and configured to maintain a space between the display panel and the window.

In the above display device, further comprising an adhesive layer placed between the adjacent partitions.

According to some embodiments, it is possible to provide a display device which has improved robustness against various external factors and still can maintain its flexible properties.

DETAILED DESCRIPTION OF CERTAIN INVENTIVE EMBODIMENTS

Figure 1:
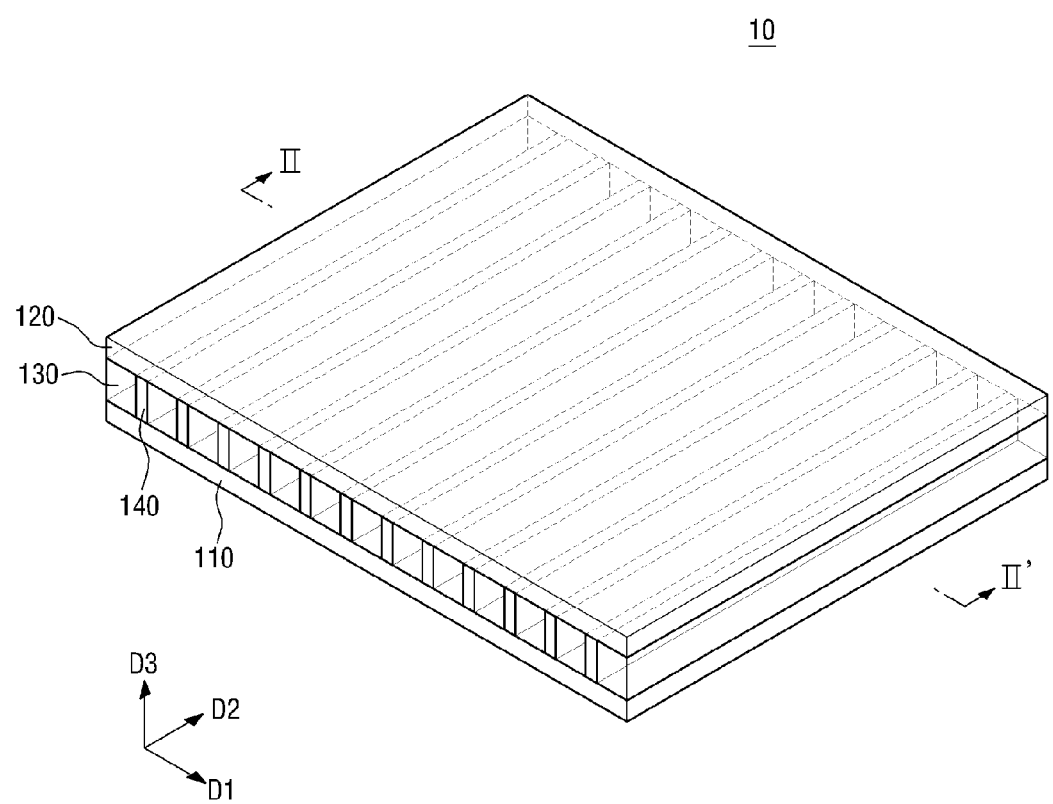
FIG. 1 is a perspective view illustrating a display device according to an embodiment.

Polymer-based windows are generally thinner and softer than glass windows. Accordingly, polymer-based windows may not be able to provide as much durability as glass windows. That is, flexible displays, and particularly, the inner elements thereof, may be destroyed or damaged due to various external factors such as vertical stress and friction caused by a touch, bending or folding.

The aspects and features of the described technology and methods for achieving the aspects and features will be apparent by referring to the embodiments to be described in detail with reference to the accompanying drawings. However, the described technology is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the described technology, and the described technology is only defined within the scope of the appended claims.

The term "on" that is used to designate that an element is on another element or located on a different layer or a layer includes both a case where an element is located directly on another element or a layer and a case where an element is located on another element via another layer or still another element. In the entire description of the described technology, the same drawing reference numerals are used for the same elements across various figures.

Although the terms "first, second, and so forth" are used to describe diverse constituent elements, such constituent elements are not limited by the terms. The terms are used only to discriminate a constituent element from other constituent elements. Accordingly, in the following description, a first constituent element can be a second constituent element. In this disclosure, the term "substantially" includes the meanings of completely, almost completely or to any significant degree under some applications and in accordance with those skilled in the art.

Hereinafter, embodiments of the described technology will be described with reference to the attached drawings.

Hereinafter, embodiments of the described technology will be described in detail with reference to the accompanying drawings. FIG. 1 is a perspective view illustrating a display device according to an embodiment.

Referring to FIG. 1, a display device 10 includes a display panel 110, a window or transparent layer 120, an adhesive 130, and a plurality of partitions or buffer members or buffers 140.

The display panel 110 can display an image. The display panel 110 can be, but is not limited to, an emissive display panel such as an organic light-emitting diode (OLED) panel. Alternatively, the display panel 110 can be a non-emissive display panel such as a liquid crystal display (LCD) panel, an electrophoretic display (EPD) panel or an electrowetting display (EWD) panel. In response to a non-emissive display panel being used as the display panel 110, the display device 10 can also include a backlight unit (not illustrated) supplying light to the display panel 110. The display panel 110 can be accommodated in a housing (not illustrated). The housing, which forms the exterior of the display device 10, can protect the display panel 110 from an external impact (e.g., falling on the ground) and can prevent external materials (e.g., oxygen or water) from infiltrating into the display panel 110. The housing can accommodate therein not only the display panel 110, but also a printed circuit board (PCB) on which a plurality of active devices are mounted. The window 120 can be disposed over the display panel 110.

The window 120 can be placed on a display surface of the display panel 110 where an image is displayed. The window 120 can form the exterior of the display device 10 along with the housing by being coupled to the housing. The display panel 110, the housing and the window 120 can all be flexible. In some embodiments, a substrate (not illustrated) of the display panel 110 is formed of a material such as a plastic material or a metal foil that can be easily bent by an external force. In some embodiments, the housing is formed of a plastic material such as polycarbonate (PC). In some embodiments, the window 120 is formed of a highly-transmissive plastic material. As a result, the display device 10 can be flexible. A touch panel (not illustrated) can be placed between the display panel 110 and the window 120. The touch panel can recognize the pressure applied to the window 120, and can transmit the results of the recognition to the display panel 110, thereby providing a touch function.

The space between the display panel 110 and the window 120 can be divided by the partitions 140. In some embodiments, the partitions 140 are formed between the display panel 110 and the window 120. The partitions 140 can be spaced from one another along a first direction D1, and can extend in a second direction D2, which is substantially perpendicular to the first direction D1. In some embodiments, the space between the display panel 110 and the window 120 is divided into a plurality of sub-spaces, each sub-space defined by a pair of adjacent partitions 140. The partitions 140 can be inclined upwardly from a base surface of the display panel 110. In some embodiments, the internal angle between the partitions 140 and the base surface of the display panel 110 is about 90 degrees. In some embodiments, the partitions 140 extend in three directions, first ends of the partitions 140 contact the display panel 110, and second ends of the partitions 140 can contact the window 120. The partitions 140 can support the display panel 110 and the window 120, or can connect to the display panel 110 and the window 120. In some embodiments, the partitions 140 are formed as bars that extend in the second direction D2. Each of the bars can have a quadrilateral shape. The partitions 140 will be described later in detail. The space between the display panel 110 and the window 120 can be filled with the adhesive 130.

The adhesive 130 can attach the display panel 110 and the window 120 together. Because the adhesive 130 is formed on the display surface of the display panel 110, the adhesive 130 can be formed of a highly-transparent material such as, for example, a pressure sensitive adhesive (PSA), but is not limited thereto. In some embodiments, the adhesive 130 offers excellent adhesion between the display panel 110 and the window 120, and uniformly maintains the adhesion even when the display device 10 is at least partially deformed, that is, even when the display device 10 is bent or folded. The adhesive 130 and the partitions 140 can form an adhesive layer which attaches the display panel 110 and the window 120 together. The adhesive 130 and the partitions 140 will hereinafter be described in further detail with reference to FIGS. 2 and 3.

Figure 2:
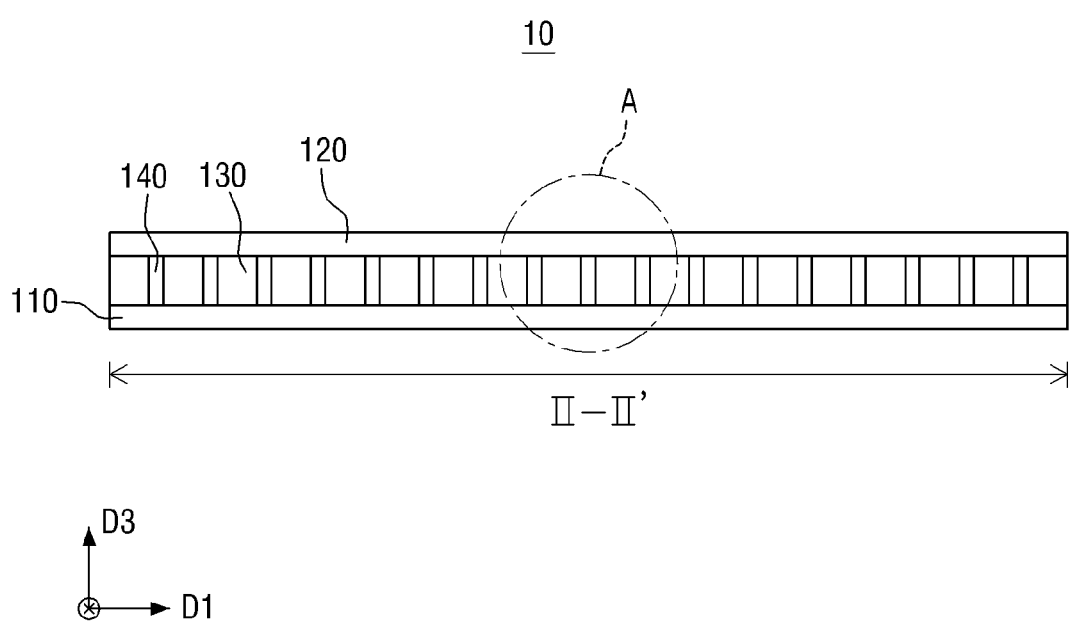
FIG. 2 is a cross-sectional view taken along line II-II' of FIG. 1.
Figure 3:
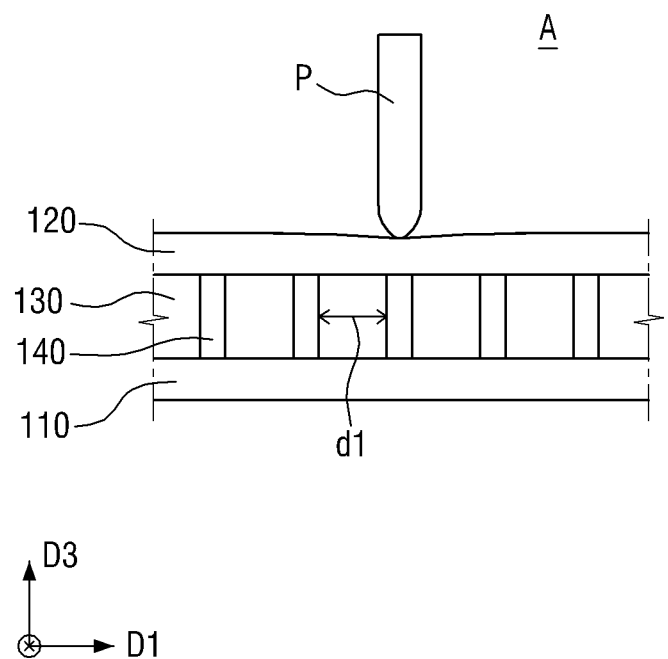
FIG. 3 is an enlarged cross-sectional view illustrating portion A of FIG. 2.

FIG. 2 is a cross-sectional view taken along line II-II' of FIG. 1. FIG. 3 is an enlarged cross-sectional view illustrating portion A of FIG. 2.

Referring to FIGS. 2 and 3, the adhesive 130 and the partitions 140 form the adhesive layer. The adhesive 130 and the partitions 140 can both be formed of an optical transparent material, but the adhesive 130 can be flexible, rather than hard, and the partitions 140 can be hard, rather than flexible. In some embodiments, the partitions 140 are formed of a transparent curable material such as a curable resin, perhydropolysilazane (PHPS), or silicon oxide ($SiO_2$). The partitions 140 can serve as supporting members for supporting the display panel 110 and the window 120, and can prevent the inner elements of the display panel 110 from being damaged by an external force. As illustrated in FIG. 3, the partitions 140 provide large enough support for the display panel 110 and the window 120 to be robust against the vertical stress applied by a touch pen P. The partitions 140 can be formed to such a thickness that they can offer durability against an external force. In some embodiments, the partitions 140 are formed to a thickness of several to dozens of micrometers (μm). The partitions 140 can be spaced from one another at substantially uniform intervals of a distance d1, and the distance d1 can be several to dozens of millimeters (mm). The distance d1 can be substantially the same as the width of the sub-spaces among the partitions 140, which are filled with the adhesive 130. A third direction D3 crosses or is substantially perpendicular to the first and second directions D1 and D2. In some embodiments, the display device 10 bends or folds in the third direction D3 and/or substantially the opposite direction of the third direction D3. The folding will hereinafter be described in further detail with reference to FIGS. 4 and 5.

Figure 4:
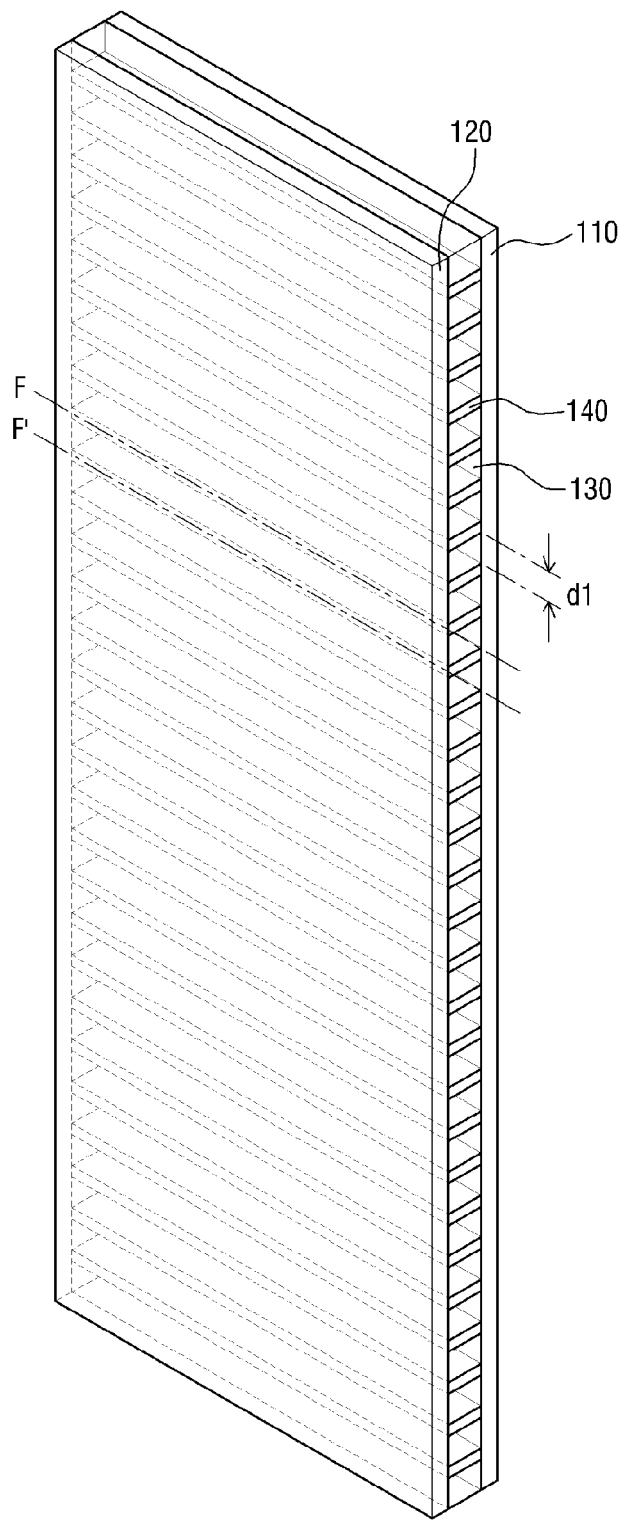
FIG. 4 is a perspective view illustrating an adhesive layer yet to be folded.
Figure 5:
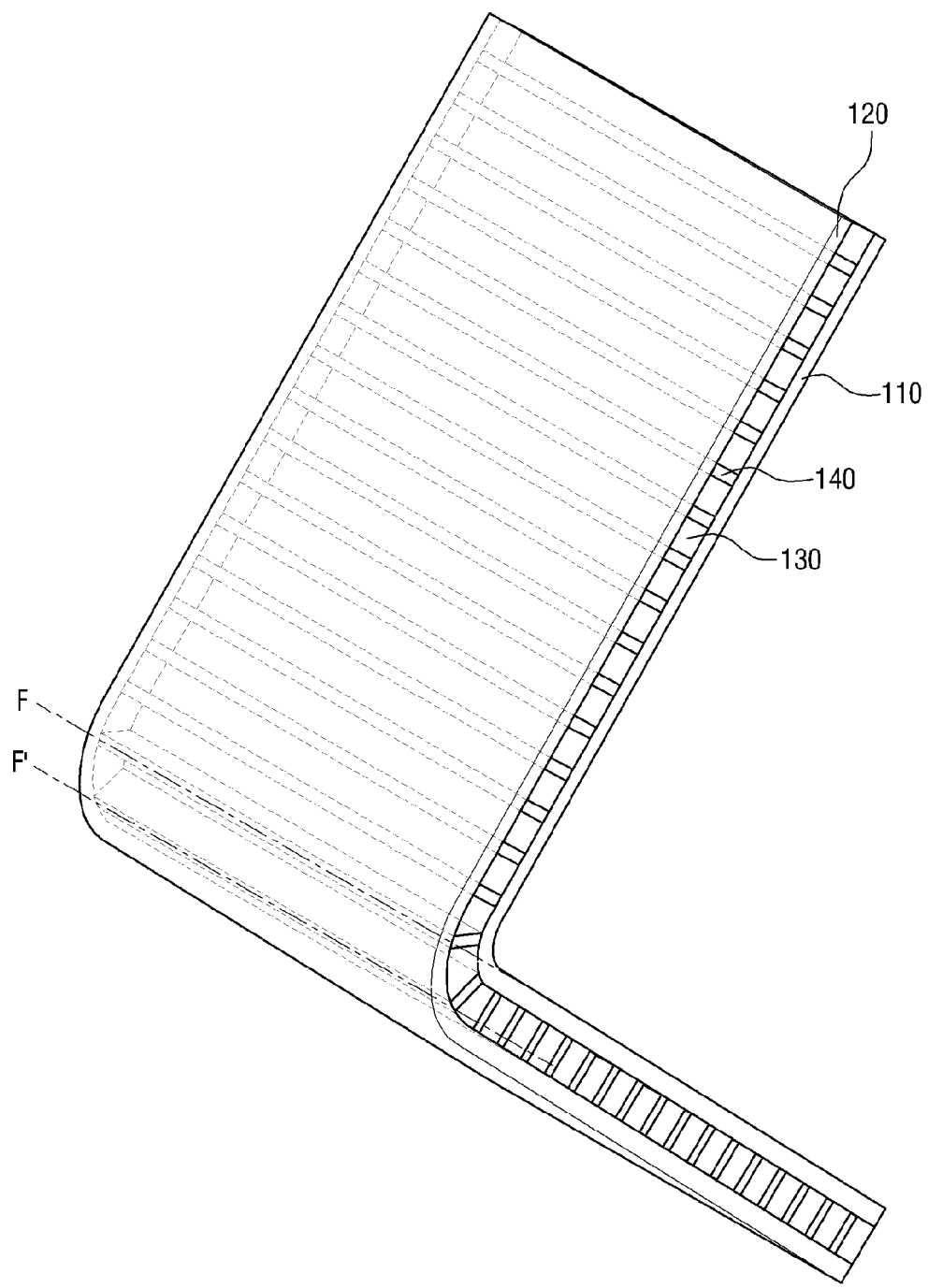
FIG. 5 is a perspective view illustrating a folded adhesive layer.

FIG. 4 is a perspective view illustrating an adhesive layer yet to be folded. FIG. 5 is a perspective view illustrating a folded adhesive layer.

The adhesive 130 can be flexible and stretchable, and can thus be able to maintain the adhesion between the display panel 110 and the window 120 even when the display device 10 is folded. In some embodiments, the adhesive 130 substantially corresponds to foldable parts of the display device 10. Accordingly, the display device 10 can be easily folded due to the presence of the adhesive 130 among the partitions 140. Each pair of adjacent partitions 140 can form fold lines F and F', which guide the display device 10 to be easily folded while preventing the deformation of the inner elements of the display device 10. As illustrated in FIG. 5, the display device 10 is folded along the fold lines F and F'. A direction in which the display device 10 is folded, and parts of the display device 10 that are actually folded are not limited to those illustrated in FIG. 5.

Because of the adhesion and the folding described above, display devices can have improved durability. A display device according to another embodiment will hereinafter be described.

Figure 6:
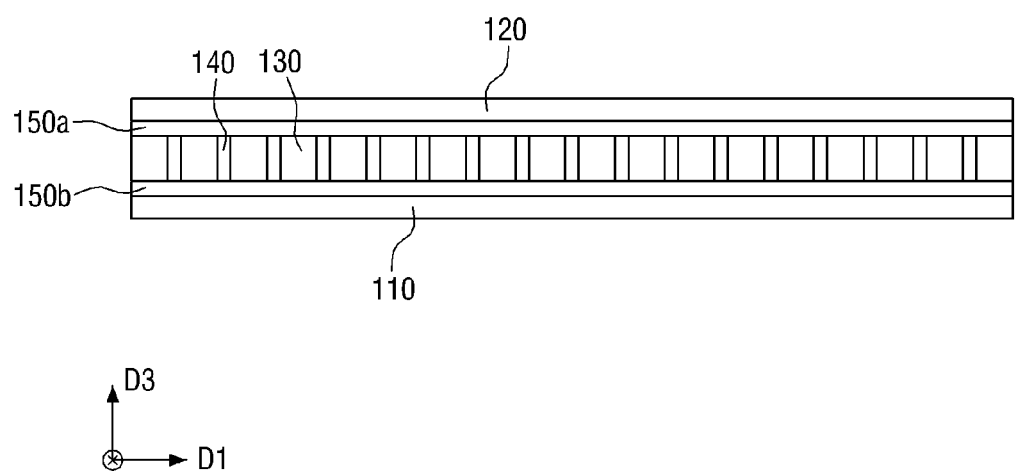
FIG. 6 is a cross-sectional view illustrating a display device according to another embodiment.

FIG. 6 is a cross-sectional view illustrating a display device according to another embodiment.

Referring to FIG. 6, a display device 11, unlike the display device 10, also include a first protective layer 150a formed on the display panel 110 and a second protective layer 150b formed below the window 120. In some embodiments, the first and second protective layers 150a and 150b are formed on the top and the bottom, respectively, of the adhesive layer including the partitions 140 and the adhesive 130. The first and second protective layers 150a and 150b can be formed of the same material as that of the partitions 140, and thicknesses of the first and second protective layers 150a and 150b can be substantially the same as the thickness of the partitions 140. In some embodiments, the first and second protective layers 150 and 150b extend in the first direction D1 and can have a thickness of several to dozens of micrometers (μm). In some embodiments, the first and second protective layers 150a and 150b are formed of a curable resin, PHPS, or $SiO_2$. The first and second protective layers 150a and 150b can prevent inner elements of the display device 11 from being damaged by an external force from the top or the bottom of the display device 11. In some embodiments, the durability of the display device 11 can be further improved by the first and second protective layers 150a and 150b.

The rest of the display device 11 is substantially the same as their respective counterparts of the display device 10 of FIGS. 1 to 5, and thus, detailed descriptions thereof will be omitted.

Figure 7:
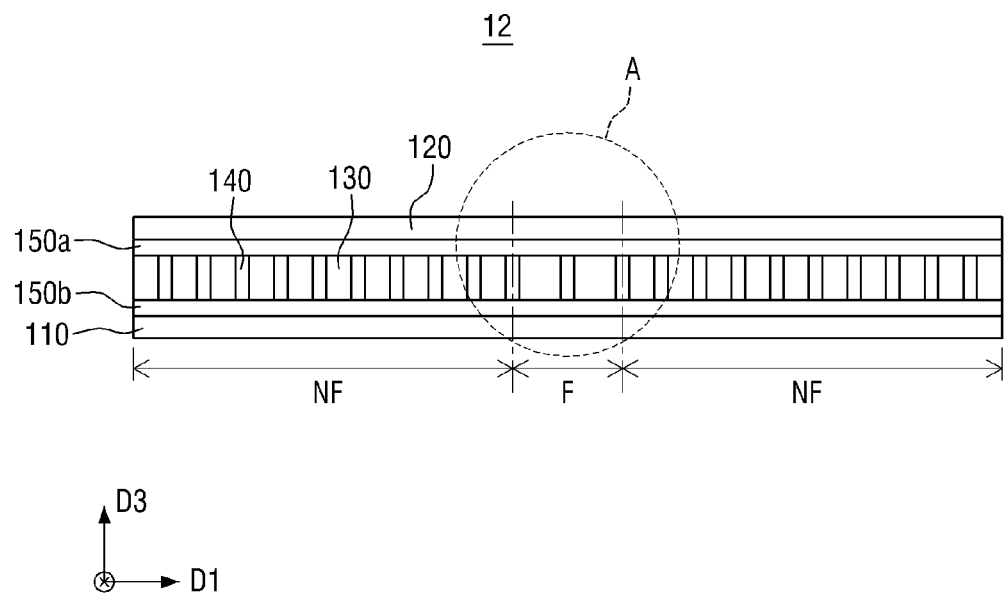
FIG. 7 is a cross-sectional view illustrating a display device according to another embodiment.
Figure 8:
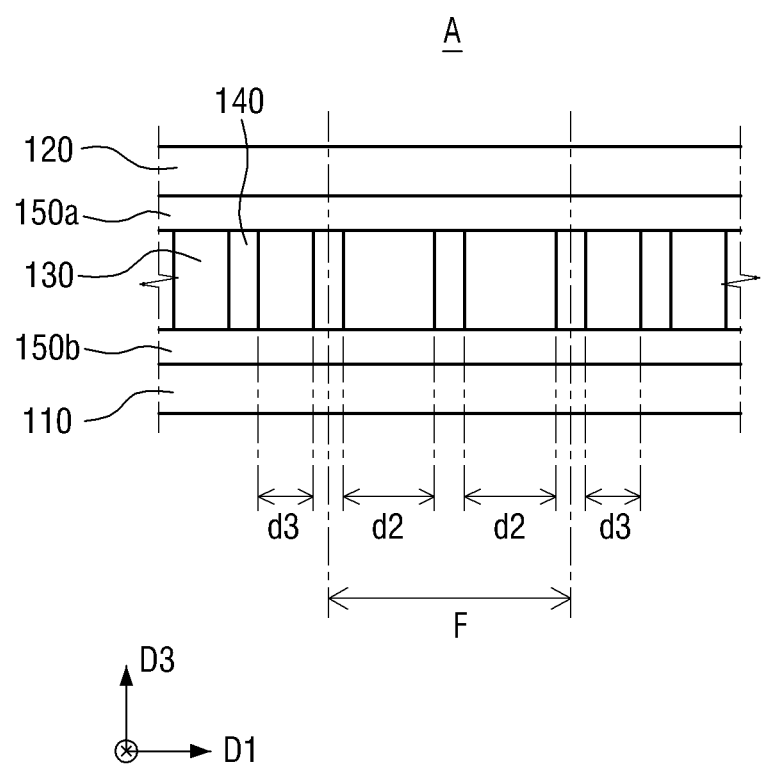
FIG. 8 is an enlarged cross-sectional view illustrating portion A of FIG. 7.

A display device according to another embodiment will hereinafter be described. FIG. 7 is a cross-sectional view illustrating a display device according to another embodiment. FIG. 8 is an enlarged cross-sectional view illustrating portion A of FIG. 7.

Referring to FIGS. 7 and 8, the display panel 110 of a display device 12 can include a foldable area F and a non-foldable area NF. The foldable area F can be an area in which the display device 12 is bent or folded, and the non-foldable area NF can be an area in which the display device 12 is not bent or folded. A distance d2 between the adjacent partitions 140 in the foldable area F can be greater than a distance d3 between the adjacent partitions 140 in the non-foldable area NF. In some embodiments, the adhesive 130 can have a larger cross-sectional area in the foldable area F than in the non-foldable area NF. Accordingly, the adhesive 130 can provide more flexibility in the foldable area F, and more durability in the non-foldable area NF.

The rest of the display device 12 is substantially the same as their respective counterparts of the display device 10 of FIGS. 1 to 5, and thus, detailed descriptions thereof will be omitted.

Figure 9:
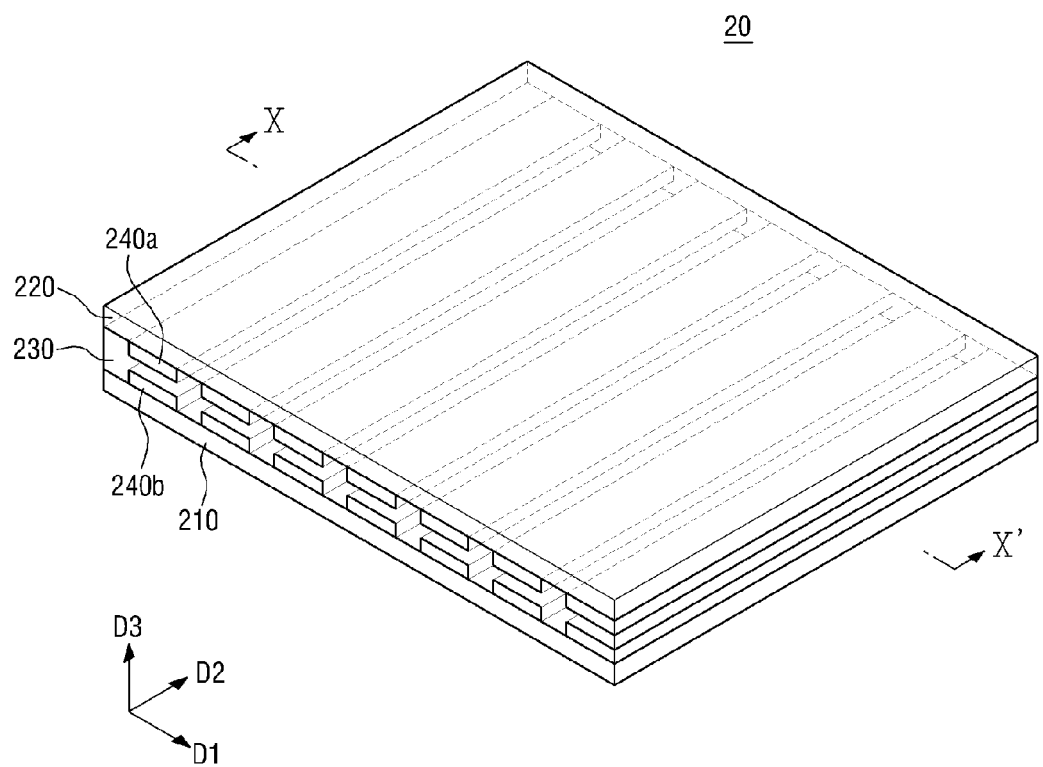
FIG. 9 is a perspective view illustrating a display device according to another embodiment.
Figure 10:
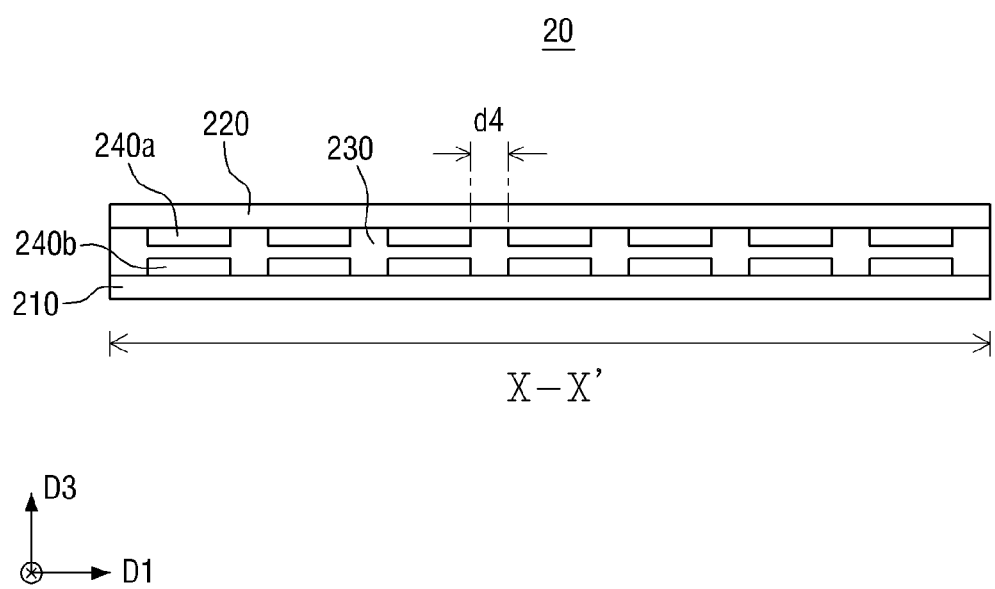
FIG. 10 is a cross-sectional view taken along line X-X' of FIG. 1.
Figure 11:
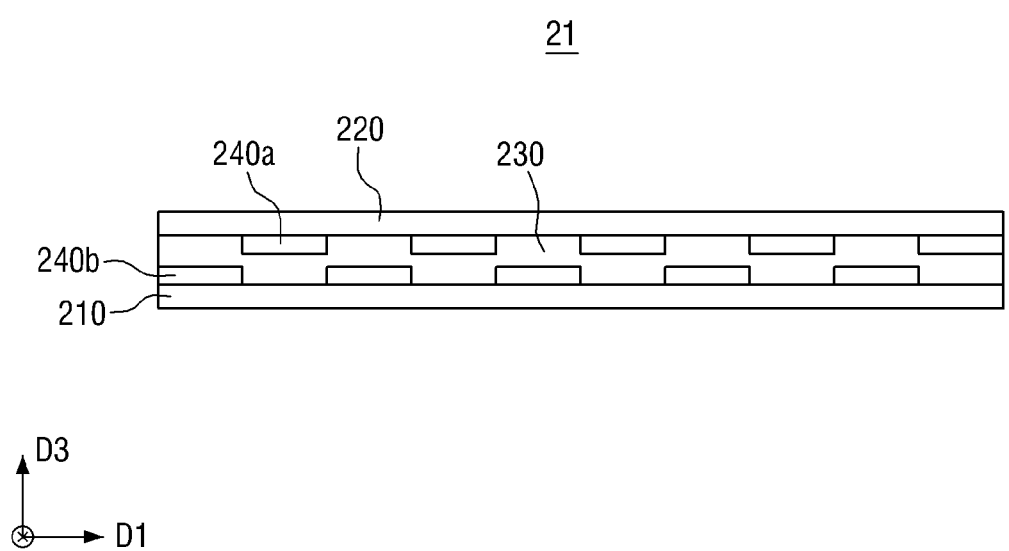
FIGS. 11 and 12 are cross-sectional views illustrating display devices according to other embodiments.
Figure 12:
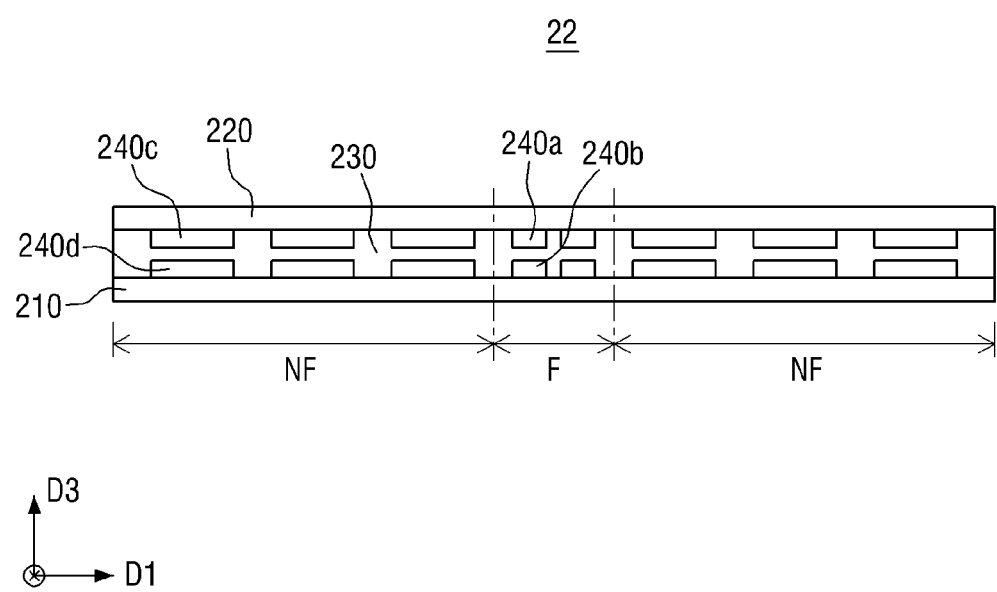

FIG. 9 is a perspective view illustrating a display device according to another embodiment. FIG. 10 is a cross-sectional view taken along line X-X' of FIG. 9. FIGS. 11 and 12 are cross-sectional views illustrating display devices according to other embodiments.

Referring to FIGS. 9 and 10, a display device 20 includes a display panel 210, a window 220, an adhesive 230 and a plurality of buffer members or partitions or buffers 240a and 240b.

The display panel 210 can display an image. The display panel 210 can be, but is not limited to, an emissive display panel such as an OLED panel. Alternatively, the display panel 110 can be a non-emissive display panel such as an LCD panel, an EPD panel or an EWD panel. When a non-emissive display panel is used as the display panel 210, the display device 20 can also include a backlight unit (not illustrated) supplying light to the display panel 210. The display panel 210 can be accommodated in a housing (not illustrated). The housing, which forms the exterior of the display device 20, can protect the display panel 210 from the external impact and can prevent the external materials from infiltrating into the display panel 210. The housing can accommodate therein not only the display panel 210, but also a PCB on which the active devices are mounted. The window 220 can be placed over the display panel 210.

The window 220 can be placed on a display surface of the display panel 210 where an image is displayed. The window 220 can form the exterior of the display device 20 along with the housing by being coupled to the housing. The display panel 210, the housing and the window 220 can all be flexible. In some embodiments, a substrate (not illustrated) of the display panel 210 on which the elements of the display panel 210 are all mounted can be formed of a material such as, for example, a plastic material or a metal foil, that can be easily bent by an external force. In some embodiments, the housing can be formed of a plastic material such as PC, and the window 220 can be formed of a highly-transmissive plastic material, but are not limited thereto. As a result, the display device 20 can be flexible. A touch panel (not illustrated) can be placed between the display panel 210 and the window 220. The touch panel can recognize the pressure applied to the window 220, and can transmit the results of the recognition to the display panel 210, thereby providing a touch function.

The space between the display panel 210 and the window 220 can be filled with the adhesive layer.

The adhesive 230 can attach the display panel 210 and the window 220 together. Because the adhesive 230 is formed on the display surface of the display panel 210, the adhesive 230 can be formed of, but is not limited to, a highly-transparent material such as, for example, a PSA. The adhesive 230 can be flexible and stretchable. That is, the adhesive 230 can substantially uniformly maintain the adhesion between the display panel 210 and the window 220 even when the display device 20 is bent or folded.

A plurality of first buffer members 240b, which are spaced from one another in the first direction D1, can be placed on the top surface of the display panel 210. A plurality of second buffer members 240a, which are spaced from one another in the first direction D1, can be placed on the bottom surface of the window 220. The first buffer members 240b can face the second buffer members 240a, respectively. In some embodiments, the first buffer members 240b at least partially overlap the second buffer members 240a, respectively. The first buffer members 240b and the second buffer members 240a can extend in the second direction D2. In some embodiments, the first and second buffer members 240b and 240a can be formed as bars. In some embodiments, the first buffer members 240b protrude toward the window 220 from the display panel 210, and the second buffer members 240a can protrude toward the display panel 210 from the window 220. In some embodiments, each of the display panel 210 and the window 220 include a plurality of recesses, which are spaced from one another in the first direction D1 and extend in the second direction D2. In this example, the first buffer members 240b can be formed in the recesses of the display panel 210, and the second buffer members 240a can be formed in the recesses of the window 220.

The first and second buffer members 240b and 240a can be formed of a more rigid material than that of the adhesive 130. In some embodiments, the first and second buffer members 240b and 240a are formed of a transparent curable material such as a curable resin, PHPS or $SiO_2$. The first buffer members 240b and the second buffer members 240a can prevent the inner elements of the display device 20 from being damaged by an external impact from the top or the bottom of the display device 20. The durability of the display device 20 can be further improved due to the first and second buffer members 240b and 240a.

The distance between adjacent first buffer members 240b can be substantially the same as that of the second buffer members 240a. The space between adjacent first or second buffer members 240b or 240a can correspond to parts of the display device 20 that are actually folded. The display device 20 can be easily folded in areas where the first or second buffer members 240b or 240a, which are highly rigid, are not formed due to the existence of the spaces. Accordingly, the first and second buffer members 240b and 240a can prevent the inner elements from being deformed regardless of whether the display device 20 is folded or bent.

The rest of the display device 20 is substantially the same as their respective counterparts of the display device 10 of FIGS. 1 to 5, and thus, detailed descriptions thereof will be omitted.

Referring to FIG. 11, a display device 21 includes the first and second buffer members 240b and 240a. The first buffer members 240b can be placed so as to not overlap the second buffer members 240a. Accordingly, in some embodiments, foldable parts on the top of the display device 21 do not coincide with foldable parts on the bottom of the display device 21. As a result, the display device 21 can be folded in various ways because the pattern in which the display device 21 is folded can differ from the top to the bottom of the display device 21.

Referring to FIG. 12, a display panel 210 of a display device 22 can include the foldable area F and the non-foldable area NF.

The first and second buffer members 240b and 240a can have a smaller cross-sectional area in the foldable area F than those of third and fourth buffer members 240d and 240c, respectively, in the non-foldable area NF. Accordingly, in some embodiments, the first and second buffer members 240b and 240a can provide more durability in the non-fold area NF, and can provide more flexibility in the foldable area F. In some embodiments, the display device 22 can be flexible in the foldable area F, and can be durable in the non-foldable area NF.

The rest of the display device 21 or 22 is substantially the same as their respective counterparts of the display device 20 of FIGS. 9 and 10, and thus, detailed descriptions thereof will be omitted.

Although embodiments have been described with reference to a number of illustrative embodiments thereof, it should be understood that numerous other modifications and embodiments can be devised by those skilled in the art that will fall within the spirit and scope of the principles of this disclosure. More particularly, variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device, comprising:
a display panel configured to display an image;
a window placed over the display panel;
a plurality of partitions interposed between the display panel and the window; and
an adhesive formed between adjacent partitions, such as shown in FIG. 1 and FIG. 2.

2. The display device of claim 1, wherein each of the partitions has a substantially quadrilateral bar shape.

3. The display device of claim 2, wherein the partitions contact the display panel and the window.

4. The display device of claim 1, wherein the partitions are substantially evenly spaced apart.

5. The display device of claim 1, further comprising a plurality of protective layers formed on a top surface of the display panel and a bottom surface of the window.

6. The display device of claim 1, wherein the display panel includes a foldable area and a non-foldable area, and wherein the partitions are spaced apart at larger intervals in the foldable area than in the non-foldable area.

7. The display device of claim 1, wherein the adhesive is formed of an optical transparent adhesive material, and wherein at least one of the partitions is formed of a curable resin, perhydropolysilazane (PHPS), or silicon oxide ($SiO_2$).

8. The display device of claim 1, wherein the partitions are spaced apart from one another and arranged in a first direction, and wherein each partition extends in a second direction crossing the first direction.

9. The display device of claim 8, wherein the display panel has a width,
wherein each of the partitions has a length, and wherein the length and width are measured in a third direction substantially perpendicular to the first and second directions.

10. The display device of claim 8, wherein each of the partitions has a width measured in the first direction, and wherein the width is less than the distance between neighboring partitions.

11. A display device, comprising:
a display panel configured to display an image;
a window placed over the display panel;
a plurality of first partitions formed on a top surface of the display panel and spaced apart from one another;
a plurality of second partitions formed on a bottom surface of the window facing the first partitions, respectively, and spaced apart from one another; and
an adhesive layer placed between the adjacent partitions, wherein the first partitions are spaced apart from the second partitions, such as shown in FIGS. 9, 10.

12. The display device of claim 11, wherein a first distance is defined as the distance between adjacent first partitions, wherein a second distance is defined as the distance between adjacent second partitions, and wherein the first and second distances are substantially the same.

13. The display device of claim 11, wherein at least one of the first partitions at least partially overlaps the corresponding second partition.

14. The display device of claim 11, wherein at least one of the first partitions does not overlap the corresponding second partition.

15. The display device of claim 11, wherein the display panel includes a foldable area and a non-foldable area, and wherein the first and second buffer members have a smaller cross-sectional area in the foldable area than in the non-foldable area.

16. The display device of claim 11, wherein none of the first and second partitions overlap.

17. The display device of claim 16, wherein the first and second partitions are alternately formed.

18. A display device, comprising:
a display panel configured to display an image;
a window placed over the display panel;
three or more partitions interposed between and configured to maintain a space between the display panel and the window; and
an adhesive layer placed between the adjacent partitions, wherein the partitions are spaced apart from one another.

* * * * *